United States Patent [19]
Wang et al.

[11] Patent Number: 6,058,090
[45] Date of Patent: May 2, 2000

[54] LOADING MECHANISM FOR DISK RECORDING AND/OR REPRODUCING DEVICE

[76] Inventors: Wei-Che Wang, No.2-1, Alley 72, Shinyi Str., ShinYin City Tainan; Che-Yuan Hwang, 3rd Fl., No.16-1, Alley 24, Kingmen Str., Taipei City, both of Taiwan

[21] Appl. No.: 09/096,202

[22] Filed: Jun. 11, 1998

[51] Int. Cl.[7] .................................................. G11B 33/02
[52] U.S. Cl. ........................................................ 369/77.1
[58] Field of Search ................................ 369/75.1, 75.2, 369/77.1, 77.2; 360/99.02, 99.03, 99.06, 99.07

[56] References Cited

U.S. PATENT DOCUMENTS

| | | | |
|---|---|---|---|
| 4,829,502 | 5/1989 | Aoyagi et al. | 369/77.1 |
| 5,038,331 | 8/1991 | Ogawa | 369/36 |
| 5,172,361 | 12/1992 | Urushibata et al. | 369/77.1 |
| 5,933,408 | 8/1999 | Park et al. | 369/271 |
| 5,970,042 | 10/1999 | Fujimoto et al. | 369/247 |
| 5,986,981 | 11/1999 | Takemasa et al. | 369/37 |

FOREIGN PATENT DOCUMENTS 9-292758  10/1997  Japan .

*Primary Examiner*—Stuart S. Levy
*Assistant Examiner*—Kenneth W. Fields
*Attorney, Agent, or Firm*—Pro-Techtor International Services

[57] ABSTRACT

A loading mechanism for a compact disk (CD) recording and/or reproducing device, comprising: a motor; a set of gears; a lever plate; a gliding piece; and a CD carrier. Mounting and dismounting of the CD is driven by a combination of a linear and a rotatory movement, allowing the operations of inserting/ejecting and raising/lowering of the CD to be driven by a single motor. The arrangement provides stable movements with minimum vibrations, such that a high reliability of reading and recording data is achieved.

3 Claims, 10 Drawing Sheets

LOADING MECHANISM FOR DISK RECORDING AND/OR REPRODUCING DEVICE

BACKGROUND OF THE INVENTION

1. Field of the Invention

The present invention relates to an improved disk loading mechanism for a compact disk (CD) recording and/or reproducing device.

2. Description of Related Art

A conventional disk loading mechanism, as disclosed in U.S. Pat. No. 5,172,361 "Disk Loading Apparatus", uses cams to drive the raising and lowering of the reading device for clamping and releasing a CD. The CD is loaded and unloaded by the movement of a toothed sector. This arrangement, however, requires two driving motors, which causes high production cost and complicated assembly.

SUMMARY OF THE INVENTION

The main object of the present invention is to provide a disk loading mechanism for a compact disk recording and/or reproducing device with a simple structure for easy assembly and low production cost.

Another object of the present invention is to provide d loading mechanism for a compact disk recording and/or reproducing device with high stability for high reliability of reading data.

A further object of the present invention is to provide a loading mechanism for a compact disk recording and/or reproducing device, wherein a rack and a planetary gear replace the conventionally used cams for driving the raising and lowering of the disk and wherein a gear drives the loading and unloading movement of the disk.

The loading mechanism for a compact disk (CD) recording and/or reproducing device of the present invention comprises: a motor; a set of gears; a cam plate; a gliding piece; a reading device support; and a CD carrier. The disk is mounted by a combined linear and planetary movement. For mounting the disk, first a linear rack on the CD carrier is driven by a gear. The distance between the gear and the CD carrier is kept constant by blocking the gliding piece and the cam plate in a groove. As soon as the CD carrier has been inserted into the frame, the gear starts to revolve around another gear, rotating the cam plate. At the same time the gliding piece moves and causes the reading device support to rise, so as to clamp the disk. For dismounting the disk, the same movements are performed in reverse order. The arangement of the loading mechanism of the present invention ensures reduced vibrations and thus a high reliability of reading data.

The present invention can be more fully understood by reference to the following description and accompanying drawings.

DETAILED DESCRIPTION OF THE PREFERRED EMBODIMENT

Figure 1:
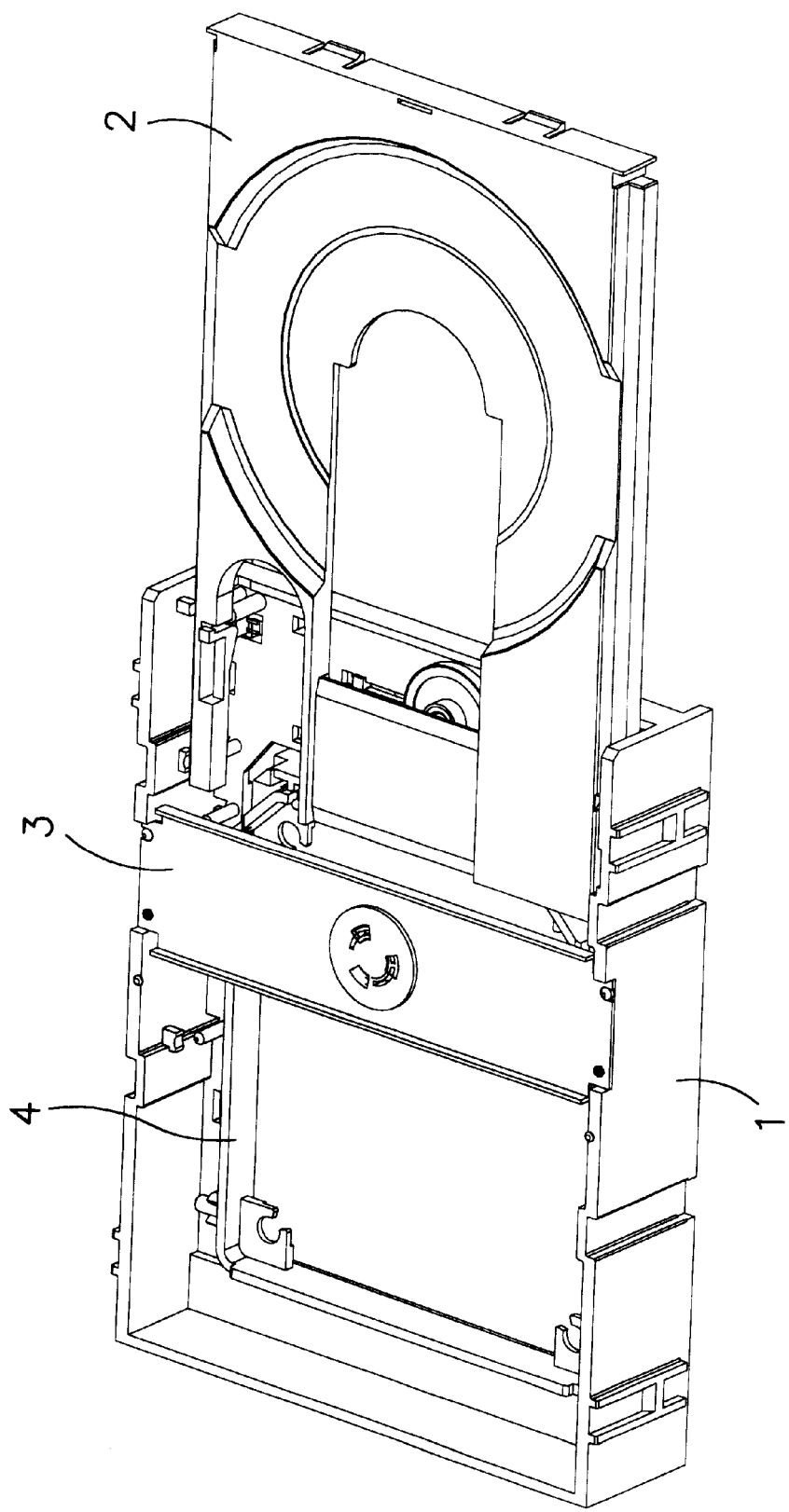
FIG. 1 is a perspective view of the loading mechanism of the present invention.

The loading mechanism of the present invention is used in a compact disk (CD) recording and/or reproducing device, having a reading device for reading a compact disk (CD), moving between a loading/unloading state for loading/unloading the CD and a reading state for reading the CD. As shown in FIG. 1, the loading mechanism of the present invention mainly comprises: a frame 1 with a front side and a rear side, parallel to a transverse direction, and two lateral sides, parallel to a longitudinal direction; a CD carrier 2 for carrying the CD, the CD carrier 2 gliding in a longitudinal movement in and out of the frame 1 through the front side thereof for loading and unloading the CD; an upper plate 3 for holding the CD; a reading device support 4 with a front end and a rear end for supporting the reading device (not shown); and a transmission unit 20 for driving the CD carrier 2, so as to mount and dismount the CD. A left side and a right side are defined as seen from the front side of the frame 1.

The reading device support 4 is mounted inside the frame 1. The frame 1 has bearings 1a in the lateral sides close to the rear side thereof. As shown in FIG. 2A, the reading device support 4 has two lateral sides, from which two aligned pins 4a extend outward to be laid into the bearings 1a. Thus the reading device support 4 is hingedly mounted inside the frame 1, being rotatable around an axis through the pins 4a.

Figure 3A:
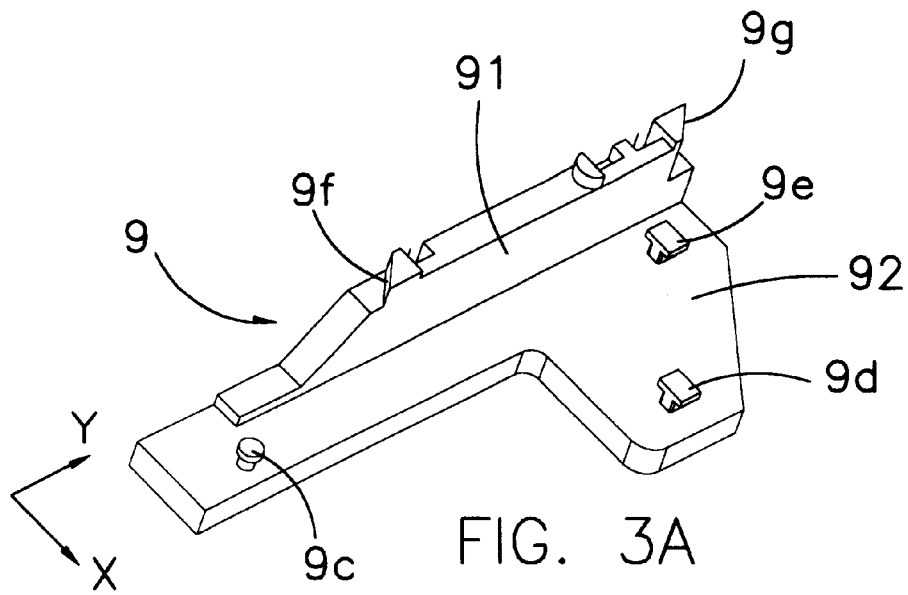
FIG. 3A is a perspective view of the gliding piece of the present invention.
Figure 3B:
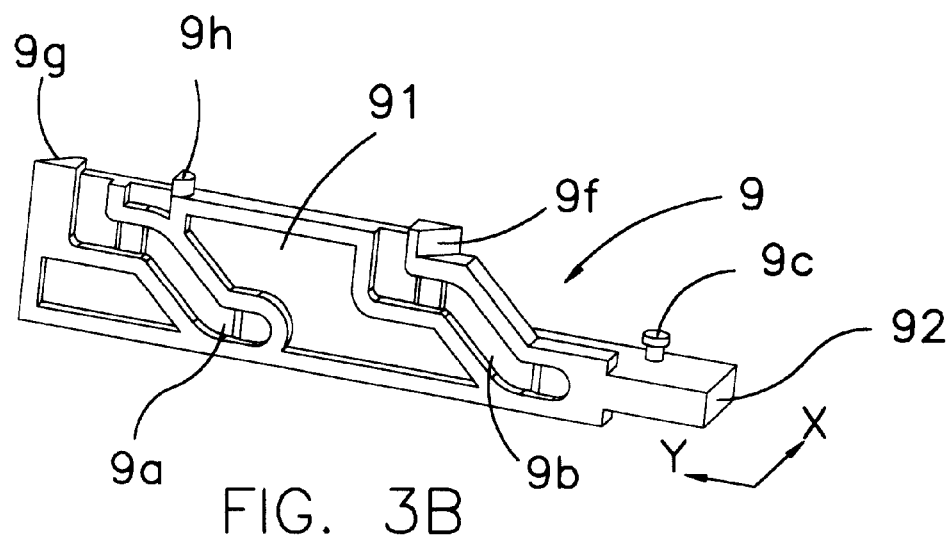
FIG. 3B is a perspective view of the gliding piece of the present invention, shown from the rear.

A gliding piece 9 is fastened to the front side of the reading device support 4. As shown in FIGS. 3A and 3B, with the X axis pointing along the longitudinal direction to the front and the Y axis pointing along the transverse direction to the right, the gliding piece 9 has a vertical plate 91, into which two sloped grooves 9a, 9b are cut. The sloped grooves 9a, 9b have relatively low left ends and relatively high right ends. Two oblique elements 9f, 9g, formed like vertical triangular prisms, sit on the vertical plate 91. The gliding piece 9 further has a horizontal plate 92, from which pins 9c, 9d, 9e extend upward.

Figure 2:
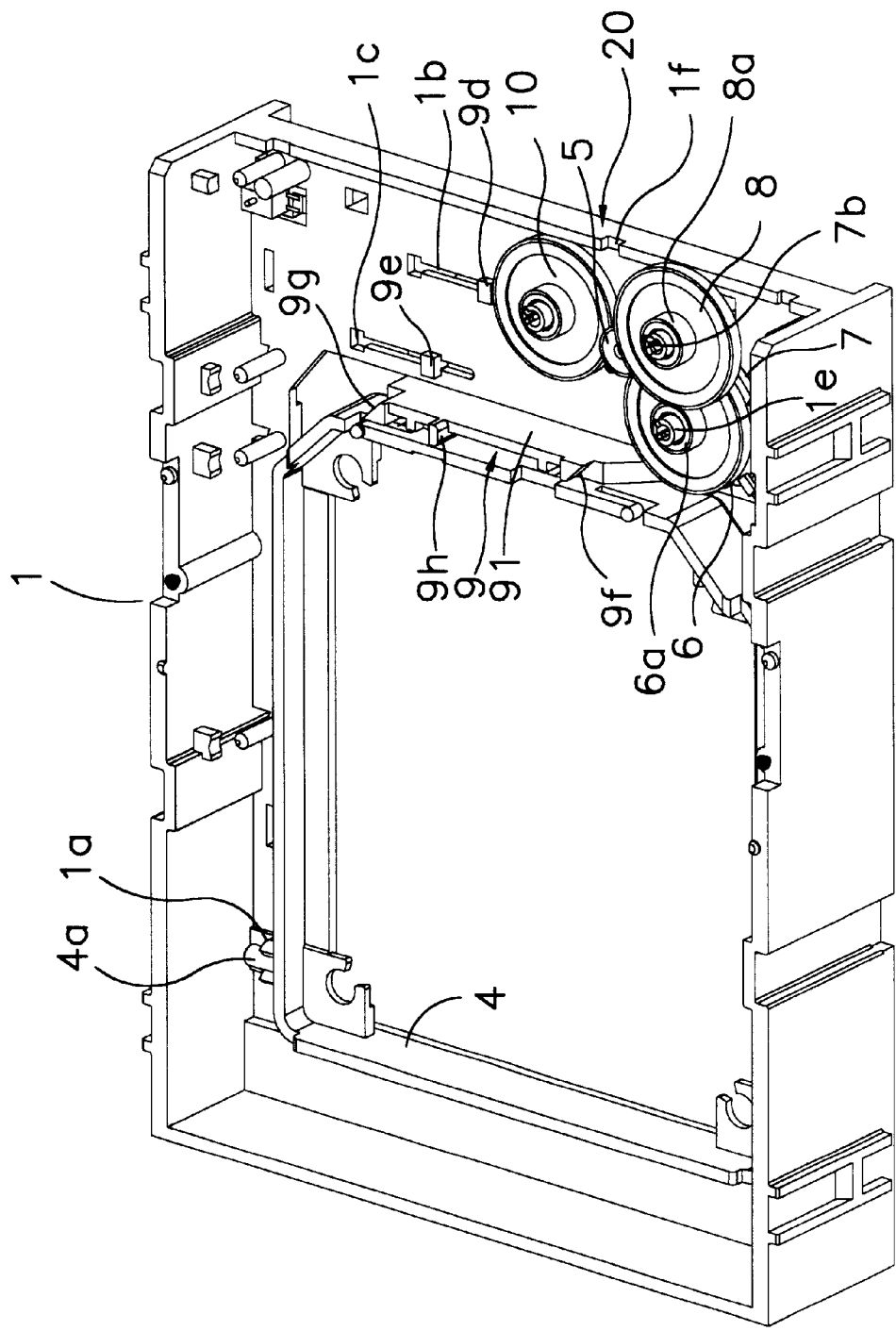
FIG. 2 is a perspective view of the loading mechanism of the present invention after removing the CD carrier and the upper plate.
Figure 2A:
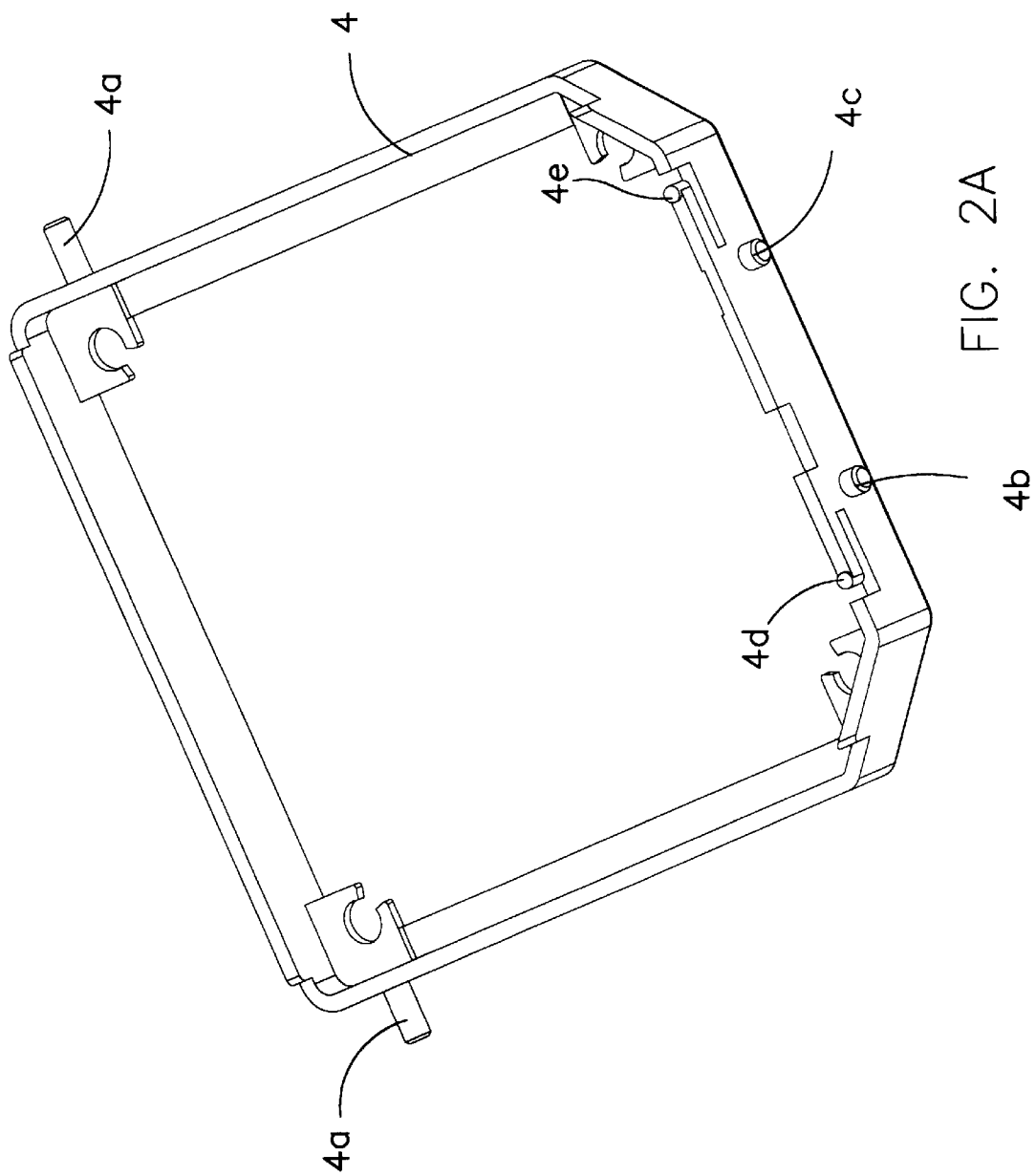
FIG. 2A is a perspective view of the reading device support of the present invention.

Referring to FIG. 2, the frame 1 has, close to the front side thereof, a base plate, into which three transverse grooves 1b, 1c, 1d are cut. The pins 9d, 9e, 9c of the horizontal plate 92 of the gliding piece 9 glide in the grooves 1b, 1c, 1d, guiding a transverse movement of the gliding piece 9, which runs perpendicular to the longitudinal movement of the CD carrier 2. The reading device support 4 has two pins 4b, 4c extending outward from the front side thereof. During the transverse movement the gliding piece 9 leans against the front side of the reading device support 4, with the pins 4b, 4c gliding in the sloped grooves 9a, 9b, respectively.

The transmission unit 20 drives the longitudinal movement of the CD carrier 2, so as to insert and extract the CD, as well as the transverse movement of the gliding piece 9, which causes the reading device support 4 to raise and lower, in order to clamp and release the CD.

Figure 5:
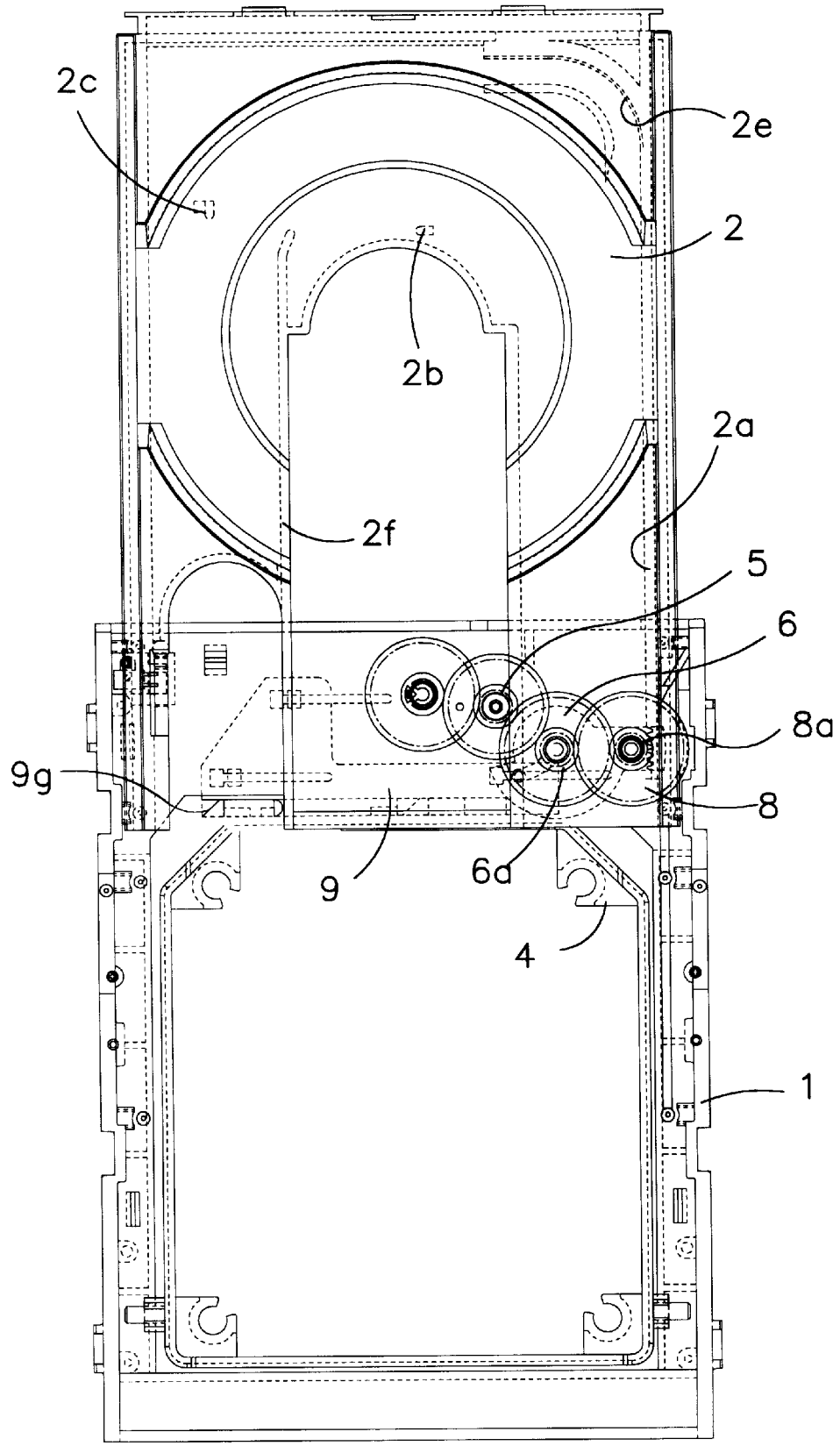
FIG. 5 is a top view of the loading mechanism of the present invention in the loading/unloading state.
Figure 6:
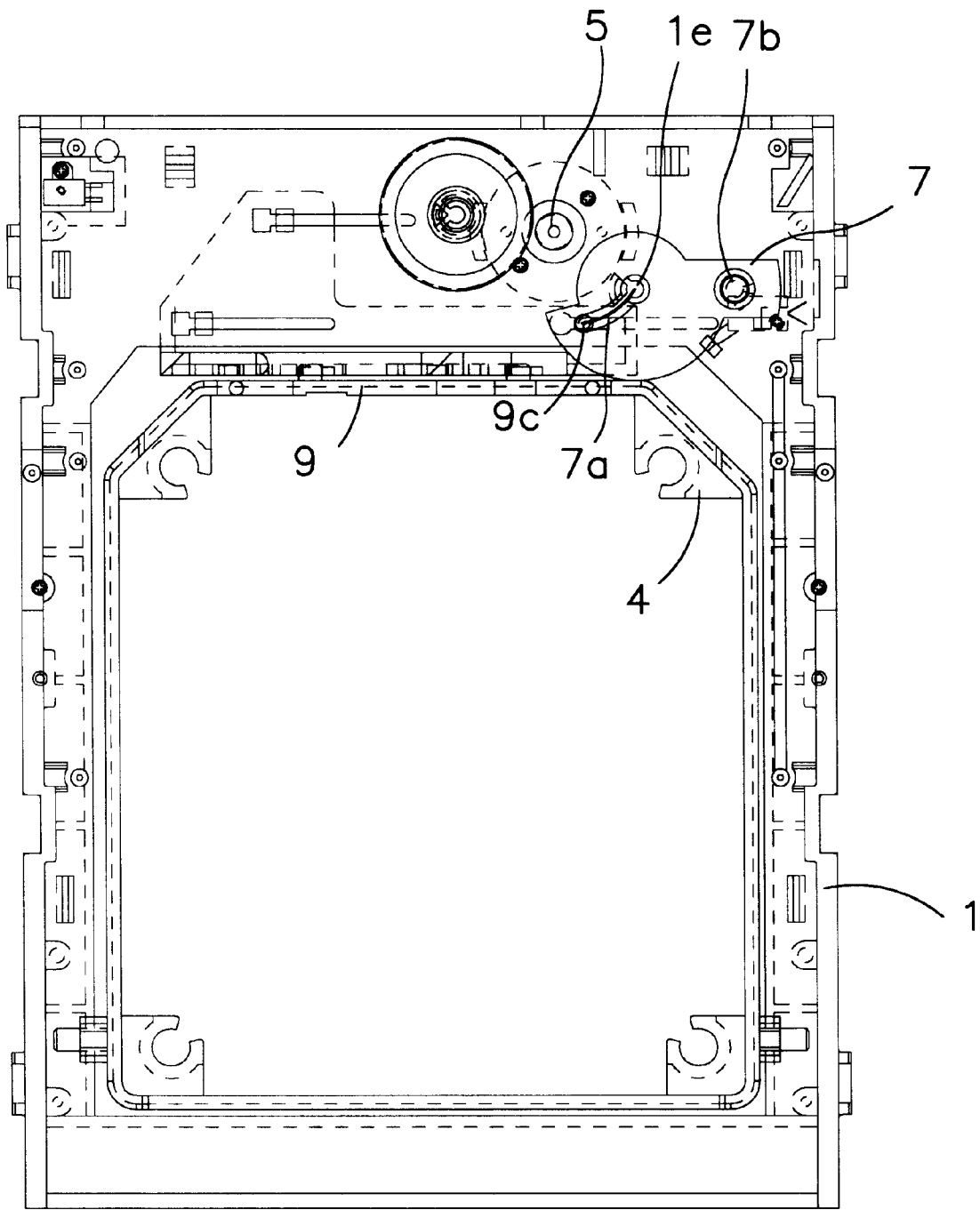
FIG. 6 is a top view of the loading mechanism of the present invention in the loading/unloading state after removing the CD carrier and the upper and lower gears.

Referring to FIGS. 2, 5 and 6, the transmission unit 20 comprises a motor (not shown) with a drive shaft; a primary gear 5 on the drive shaft of the motor; a lever plate 7, mounted on a pin 1e on the base plate; an upper gear 8, to which a concentric small gear 8a is fastened; and a lower gear 6, to which a concentric small gear 6a is fastened.

Figure 3C:
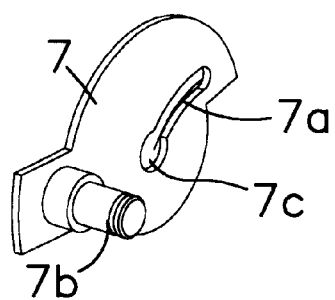
FIG. 3C is a perspective view of the cam plate of the present invention.

As shown in FIG. 3C, the lever plate 7 has a curved opening 7a, with a far end and a near end that widens to a circular hole 7c, and a bolt 7b, which perpendicularly extends away from the plane of the lever plate 7. To mount the lever plate 7, the circular hole 7c is put over the pin 1e. The upper gear 8 surrounds the bolt 7b of the lever plate 7 and engages with the small gear 6a.

Figure 4:
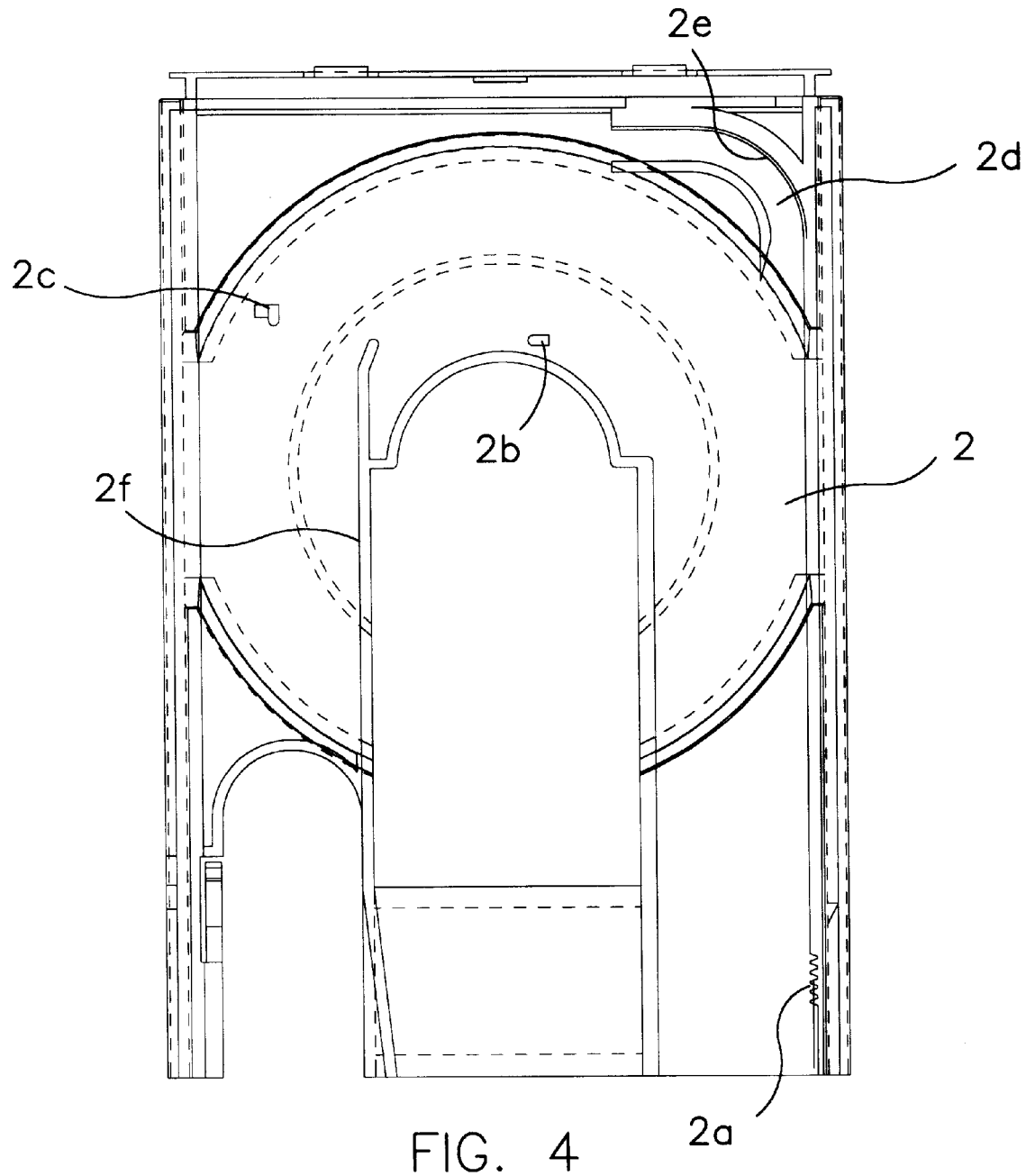
FIG. 4 is a top view of the CD carrier of the present invention.

Referring to FIG. 4, the CD carrier 2 has a longitudinal rack 2a, a curved rack 2e, projections 2b, 2c, a guiding path 2d, and a longitudinal guiding element 2f.

For mounting the loading mechanism of the present invention, first the pins 4a of the reading device support 4 are laid into the bearings 1a of the frame 1, then the pins 9c, 9d, 9e are brought from below into the grooves 1d, 1b, 1c of the frame 1. The pins 4b, 4c of the reading device support 4 are put into the sloped grooves 9a, 9b of the gliding piece 9. The circular hole 7c of the lever plate 7 is put over the pin 1e on the base plate of the frame 1, and the curved opening 7a over the pin 9c of the gliding piece 9. After that, the concentric lower and small gears 6, 6a are mounted on the pin 1e, the motor with the drive gear 5 are fixed, and the concentric upper and small gears 8, 8a are put on the bolt 7b of the lever plate 7. Finally the CD carrier 2 is mounted. The motor drives the drive gear 5, from there the lower gear 6, the small gear 6a, the upper gear 8, the small gear 8a, and finally the racks 2a and 2e.

Referring to FIG. 5, in the loading/unloading state of the loading mechanism of the present invention, the gliding piece 9 is in the rightmost position, and the reading device support 4 is held down by the low left ends of the sloped grooves 9a, 9b. The small gear 8a engages with the longitudinal rack 2a of the CD carrier 2 for moving the CD carrier 2 forward and backward.

FIG. 6 illustrates the loading/unloading state of the loading mechanism of the present invention with the CD carrier 2 and the lower and upper gears 6, 8 removed. For having the small gear 8a and the longitudinal rack 2a mutually engaged, so as to drive the CD carrier 2, the guiding element 2f of the CD carrier 2 leans against a flattened pin 9h, blocking the transverse movement of the gliding piece 9 and ensuring safe operation. In the loading/unloading state the far end of the curved opening 7a points roughly to the transverse direction, with the pin 9c passing through the far end of the curved opening 7a. Since the pin 9c is guided by the groove 1d in the frame 1, only a movement of the pin 9c in the transverse direction is possible. Thus the curved opening 7a and the pin 9c do not move relative to the groove 1d, and the lever plate 7 is blocked from rotating, keeping the distance between the small gear 8a and the CD carrier 2 fixed.

Figure 7:
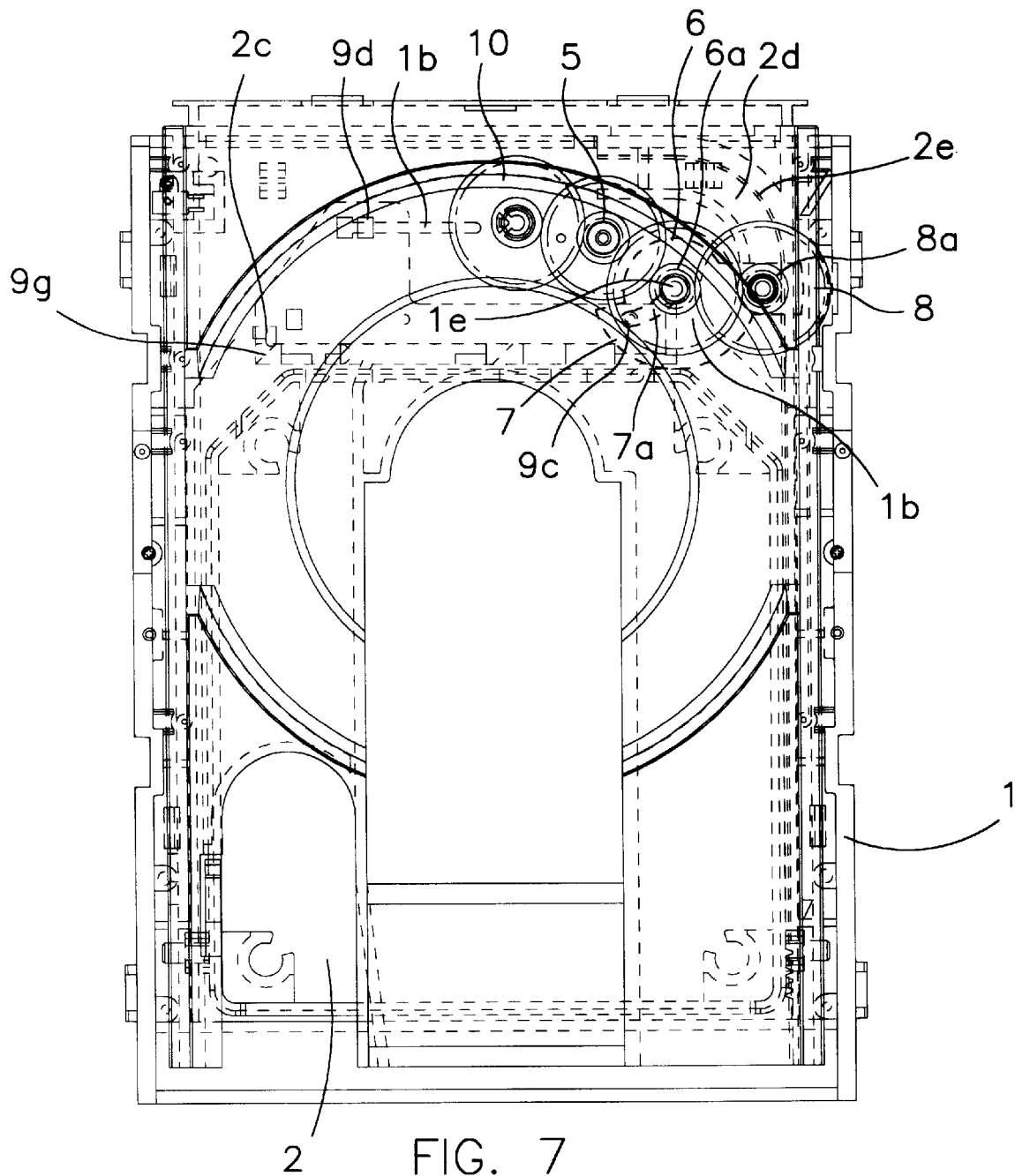
FIG. 7 is a top view of the loading mechanism of the present invention, after the CD carrier has been completely inserted.

Referring to FIG. 7, when the CD carrier 2 has been completely inserted into the frame 1, the projection 2c on the CD carrier 2 pushes the gliding piece 9 on the oblique element 9g thereof to the left, causing by the curvature of the curved opening 7a the lever plate 7 to rotate. At the same time, the small gear 8a on the bolt 7b starts to travel along the guiding path 2d. The guiding path 2d forms an arc which is concentric with the pin 1e on the frame 1, having an outer periphery, along which the curved rack 2e runs. The curved rack 2e engages with the small gear 8a. Thus the curved rack 2e, the small gear 8a with the upper gear 8, and the lower gear 6 together form a planetary gear, centered in the pin 1e, with a movement that causes the lever plate 7 to rotate counterclockwise.

Figure 8:
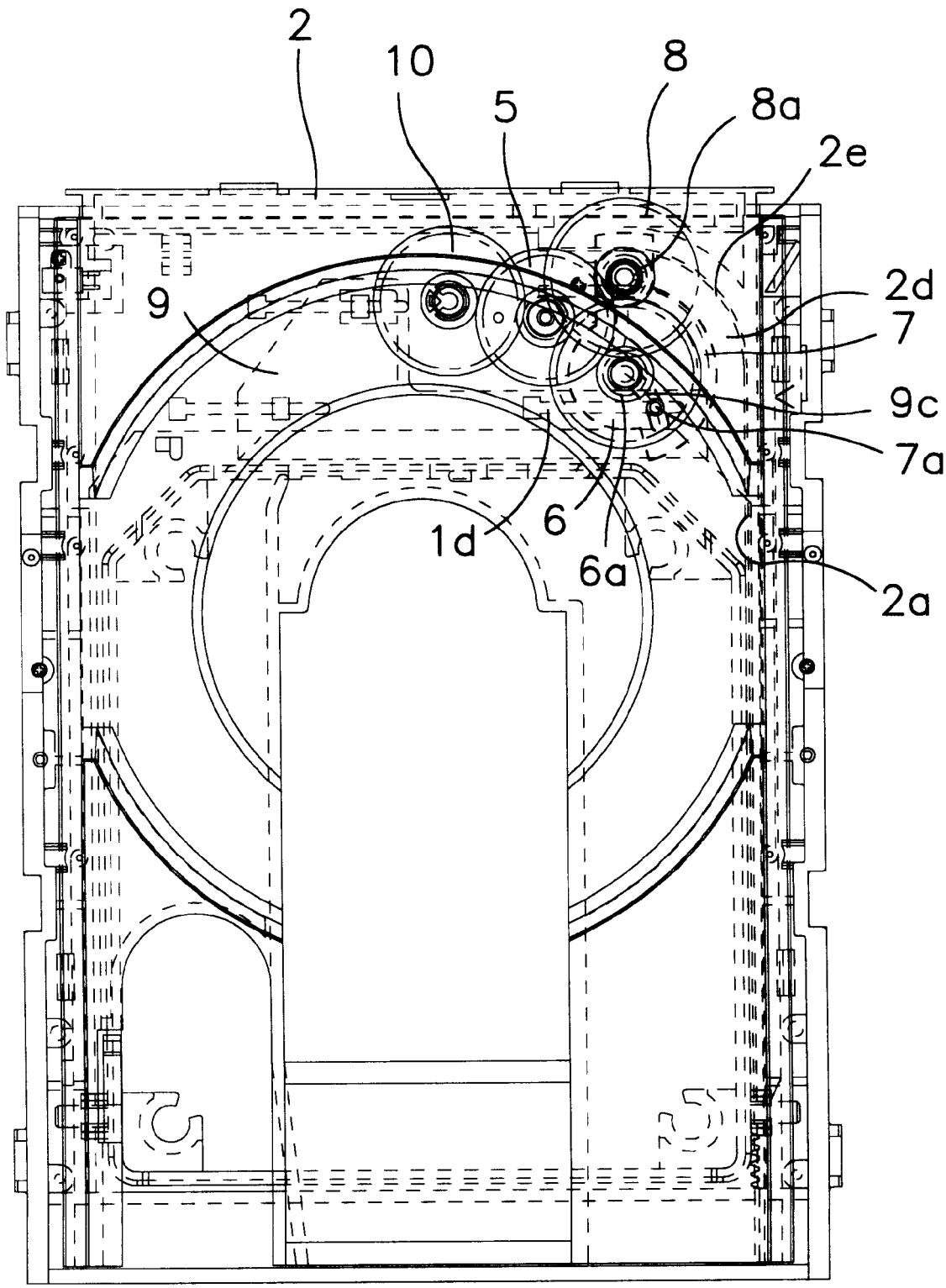
FIG. 8 is a top view of the loading mechanism of the present invention in the reading state.

Referring to FIG. 8, in the reading state of the loading mechanism of the present invention, the upper gear 8 along with the lever plate 7 has rotated around the pin 1e. The curved opening 7a has taken the gliding piece 9 to the left, such that the sloped grooves 9a, 9b have taken the pins 4b, 4c of the reading device support 4 upward, so as to clamp the CD for reading. The reading device support 4 further has projections 4d, 4e on the top side thereof, which in the reading state provide additional support for reduced vibrations and better stability.

Figure 9:
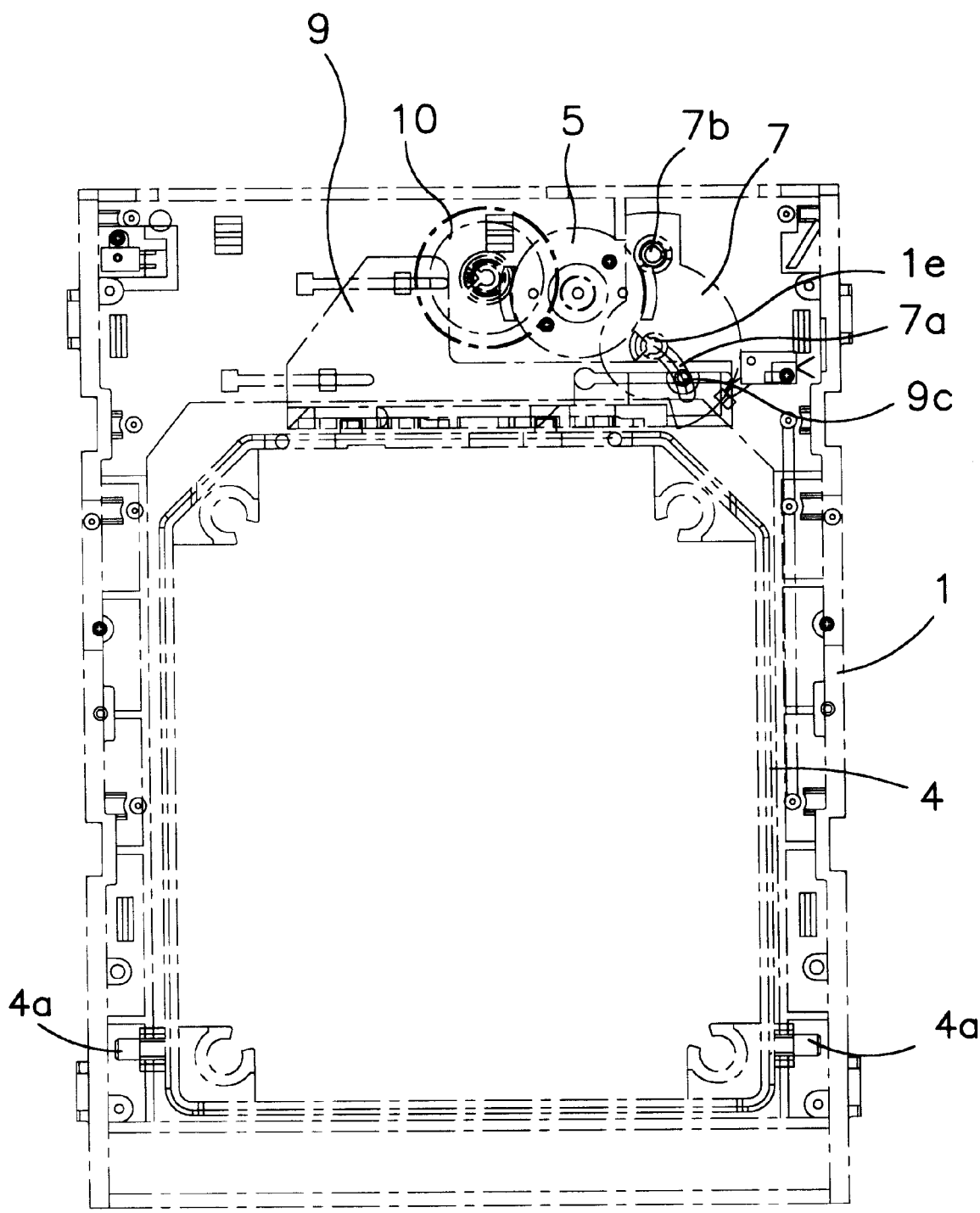
FIG. 9 is a top view of the loading mechanism of the present invention in the reading state after removing the CD carrier and the upper and lower gears.

FIG. 9 illustrates the reading state of the loading mechanism of the present invention with the CD carrier 2 and the lower and upper gears 6, 8 removed. When the lever plate 7 rotates around the pin 1e, the curved opening 7a, rotating with the lever plate 7, takes the pin 9c of the gliding piece 9 along. For leaving the reading state and switching to the loading/unloading state, the projection 2c on the CD carrier 2 pushes the gliding piece 9 on the oblique element 9g thereof to the right. The gliding piece 9 moves to the right and becomes locked with the lever plate 7, fixing the position of the upper gear 8 to engage with the longitudinal rack 2a, such that the CD carrier 2 is moved forward, out of the frame 1.

The present invention works with a single motor for moving the CD carrier 2 between the reading and the loading/unloading states and for raising and lowering the reading device support 4. Vibrations are reduced, and therefore a high reliability of reading and recording data is ensured.

As shown in FIG. 2, the loading mechanism of the present invention is provided with an emergency ejection gear 10 for ejecting a CD in case of a power failure or a defect of the CD recorder/player. The emergency ejection gear drives the gliding piece 9 to the right and is operated manually by a needle put through an opening 1f in the front side of the frame 1.

While the invention has been described with reference to a preferred embodiment thereof, it is to be understood that modifications or variations may be easily made without departing from the spirit of this invention which is defined by the appended claims.

What is claimed is:

1. A loading mechanism for a compact disk (CD) recording and/or reproducing device, having a reading device for reading a CD, moving between a loading/unloading state for loading/unloading said CD and a reading state for reading said CD, said loading mechanism comprising:

a frame with a front side, parallel to a transverse direction, with a longitudinal direction perpendicular to said transverse direction, said frame having a base plate wih several grooves parallel to said transverse direction;

a CD carrier for carrying said CD, said CD carrier having a longitudinal rack with a front end and projections, said CD carrier gliding in a longitudinal movement, in and out of said frame through said front side thereof for loading and unloading said CD;

a reading device support with a front side, from which several pins extend outward;

a gliding piece, having several pins, gliding in a transverse movement in said grooves of said frame, further having several oblique elements and several sloped grooves, into each of which one of said pins of said reading device support extends, such that during said transverse movement said reading device support is raised or lowered to clamp or release said CD;

a transmission unit for driving said longitudinal movement of said CD carrier and said transverse movement of said gliding piece, said transmission unit further comprising
a motor,
a first gear,
a second gear, engaging with said first gear,
a lever plate, mounted concentric with said second gear rotatable in a plane, having a curved opening, which guides a movement of a pin on said gliding piece, and a bolt, opposite to said curved opening, perpendicularly extending away from said plane,
a third gear, surrounding said bolt of said lever plate, engaging with said second gear and said longitudinal rack for driving said longitudinal movement of said CD carrier,
wherein said lever plate is blocked by said pin of said gliding piece from rotating, while said third gear engages with said longitudinal rack; and
a guiding path, placed on said frame close to said front end of said longitudinal rack, formed like an arc with an outer periphery, along which a curved rack runs, which engages with said third gear when said CD carrier has completely been driven into said frame, causing said third gear to revolve around said second gear;
wherein, when said CD carrier has been completely driven into said frame, said projections thereon press on said oblique elements of said gliding piece, pushing said gliding piece aside, causing said lever plate to turn and to take said third gear into said guiding path.

2. A loading mechanism for a compact disk (CD) recording and/or reproducing device according to claim 1, further having an emergency ejection system.

3. A loading mechanism for a compact disk (CD) recording and/or reproducing device according to claim 2, wherein said emergency ejection system is operated manually by a needle passed through an opening in said frame for turning said third gear, so as to eject said CD carrier.

* * * * *